United States Patent [19]
Connolly et al.

[11] Patent Number: 6,145,810
[45] Date of Patent: Nov. 14, 2000

[54] ASEPTIC VALVE CONSTRUCTION WITH DIAPHRAGM HAVING STRAIGHT NECK

[75] Inventors: Walter T. Connolly, Moraga; Luther T. Hoobyar, Palo Alto, both of Calif.

[73] Assignee: Asepco, Inc., Mountain View, Calif.

[21] Appl. No.: 09/060,169

[22] Filed: Apr. 14, 1998

[51] Int. Cl.[7] ........................................................ F16K 7/12
[52] U.S. Cl. ........................................ 251/331; 251/335.2
[58] Field of Search ................................. 251/331, 335.2

[56] References Cited

U.S. PATENT DOCUMENTS

| | | |
|---|---|---|
| 2,645,238 | 7/1953 | Thornbery . |
| 4,251,053 | 2/1981 | Wurzer ..................................... 251/331 |
| 4,819,691 | 4/1989 | Löfgren et al. ...................... 251/331 X |
| 5,152,500 | 10/1992 | Hoobyar et al. . |
| 5,452,746 | 9/1995 | Hoobyar et al. . |

OTHER PUBLICATIONS

NovAseptic Equipment AB, "The NovAseptic sanitary Tank Outlet Valves," (1997 or earlier), 7 pgs.

Primary Examiner—John Fox
Attorney, Agent, or Firm—Flehr Hohbach Test Albritton & Herbert LLP

[57] ABSTRACT

An aseptic valve construction including a valve body having an inlet flow passage and at least one outlet flow passage. The valve body has a valve seat surrounding the inlet flow passage and has an opening therein in alignment with the inlet flow passage and in communication with the inlet flow passage and with the at least one outlet flow passage. A shoulder providing a shoulder seat surrounding the opening is provided in the valve body. A diaphragm is disposed in the valve body and has a surface adapted to be moved into engagement with the valve seat and another surface in engagement with the shoulder seat. The diaphragm has a cylindrical portion extending between the surface engaging the valve seat and the surface engaging the shoulder seat. The cylindrical portion has a length and a constant inner diameter and a constant outer diameter along its length for preventing the cylindrical portion from buckling or wrinkling. A method for operating the aseptic valve construction of the present invention is provided.

8 Claims, 1 Drawing Sheet

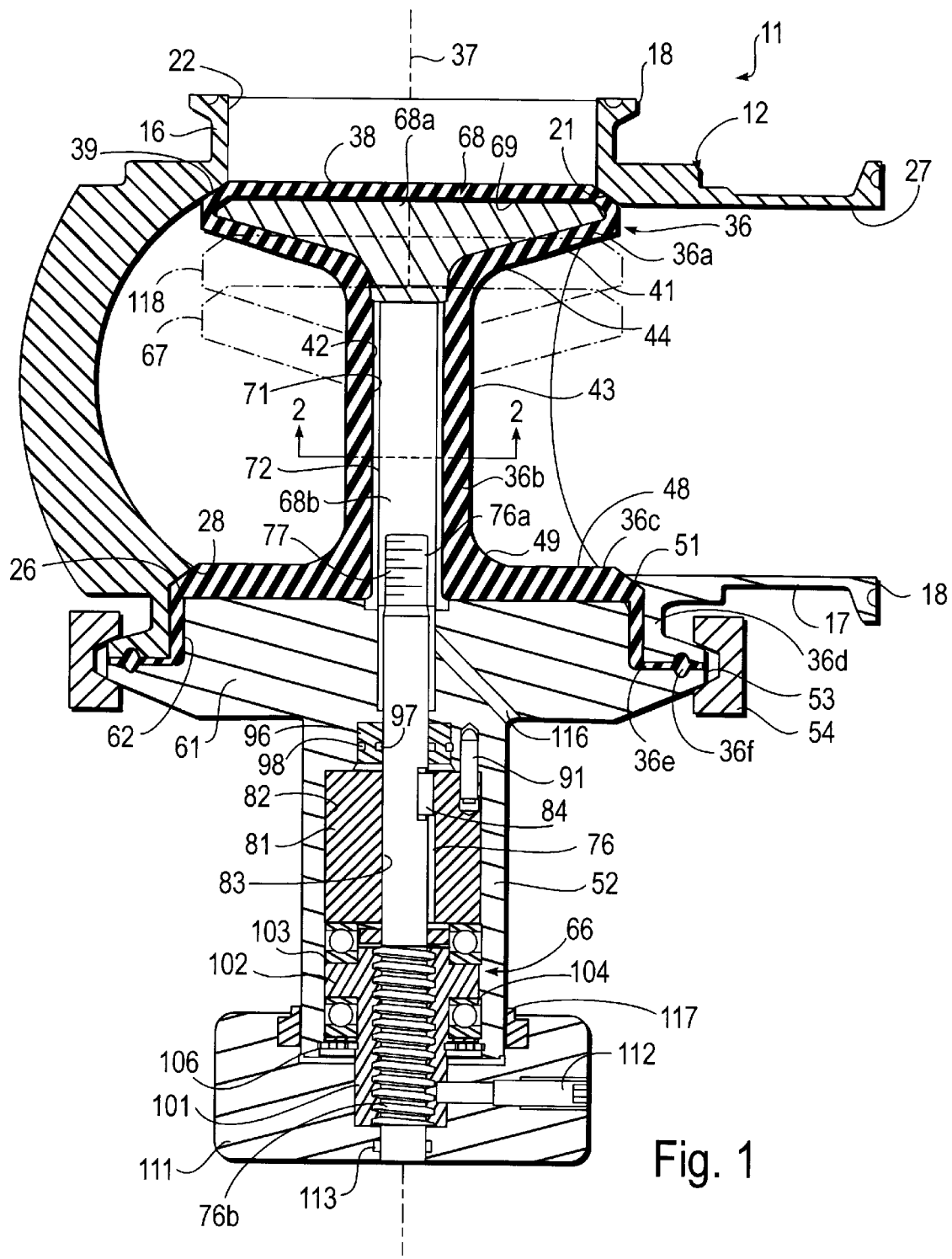
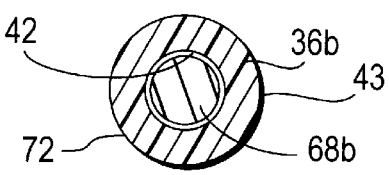
Fig. 1
Fig. 2

ASEPTIC VALVE CONSTRUCTION WITH DIAPHRAGM HAVING STRAIGHT NECK

This invention relates to an aseptic valve construction and more particularly to an aseptic valve construction having a deformable diaphragm.

Valve constructions with deformable diaphragms have heretofore been provided. See, for example, U.S. Pat. No. 2,645,238 dated Jul. 14, 1953 and U.S. Pat. No. 5,452,752 dated Sep. 26, 1995 which each disclose a valve with a diaphragm having a convoluted cross section. It has been found that diaphragms having a convoluted cross section may have a tendency to buckle in certain large size valves, for example three inches or larger, thus inhibiting cleaning of the valve. There is, therefore, a need for a new valve construction which overcomes this disadvantage.

In general, it is an object of the present invention to provide an aseptic valve construction in which the diaphragm is not susceptible to buckling or wrinkling when placed in compression.

Another object of the invention is to provide an aseptic valve construction of the above character in which areas of high stress and strain in the diaphragm are minimized so as to increase the operating life of the diaphragm.

Another object of the invention is to provide an aseptic valve construction of the above character in which the diaphragm is in tension at one extreme position and in compression at its other extreme position.

Another object of the invention is to provide an aseptic valve construction of the above character in which the diaphragm is in tension in one half of its stroke and in compression in the other half of its stroke.

Another object of the invention is to provide an aseptic valve construction of the above character in which the diaphragm has a straight neck.

Additional objects and features of the invention will appear from the following description from which the preferred embodiments are set forth in detail in conjunction with the accompanying drawings.

FIG. 1 is a cross-sectional view of an aseptic valve construction in the form of a process valve having one 90° outlet incorporating the present invention.

FIG. 2 is a cross-sectional view of the process valve of FIG. 1 taken along the line 2—2 of FIG. 1.

In general, an aseptic valve construction including a valve body having an inlet flow passage and at least one outlet flow passage is provided. The valve body has a valve seat surrounding the inlet flow passage and has an opening therein in alignment with the inlet flow passage and in communication with the inlet flow passage and with the at least one outlet flow passage. A shoulder providing a shoulder seat surrounding the opening is provided in the valve body. A diaphragm is disposed in the valve body and has a surface adapted to be moved into engagement with the valve seat and another surface in engagement with the shoulder seat. The diaphragm has a cylindrical portion extending between the surface engaging the valve seat and the surface engaging the shoulder seat. The cylindrical portion has a length and a constant inner diameter and a constant outer diameter along its length for preventing the cylindrical portion from buckling or wrinkling. A method for operating the aseptic valve construction of the present invention is provided.

More in particular, the aseptic valve construction of the present invention is a process valve 11 having a single outlet disposed at a 90° angle to its inlet. Alternatively, the aseptic valve construction of the present invention can be provided with more than one outlet. The process valve 11 can be of the type described in U.S. Pat. No. 5,152,500 dated Oct. 6, 1992, the contents of which are incorporated herein by this reference. The process valve 11 is provided with a valve body 12 made from stainless steel or any other suitable material and having an inlet 16 and at least one outlet in the form of outlet 17. Inlet 16 and outlet 17 are each provided with a flange 18 which is adapted to receive flat gaskets with integral O-ring sections (not shown).

Valve body 12 is provided with an annular valve seat 21 which circumscribes an inlet flow passage 22 provided in inlet 16. Valve body 12 has an opening 26 which is opposite of the inlet flow passage 22 and is in alignment therewith. The opening 26 is in communication with inlet flow passage 22 as well as an outlet flow passage 27 provided in outlet 17. An annular inclined shoulder seat 28 is provided in valve body 12 and circumscribes opening 26. Inlet and outlet flow passages 22 and 27 each have an inner diameter of approximately three inches.

Diaphragm means 36 is provided for closing the opening 26 in valve body 12 and also for movement into and out of engagement with valve inlet seat 21 to control the flow of liquid from inlet passage 22 through outlet passage 27. Diaphragm means or diaphragm 36 is made from any suitable elastomeric material such as medical grade silicon rubber and extends along a longitudinal axis 37. The diaphragm 36 has an upper or head portion 36a having a planar surface 38 that extends across inlet passage 22. Planar surface 36a adjoins an outwardly and downwardly inclined annular surface 39. Portion 36a is further provided with a lower annular surface 41 which extends upwardly and radially outwardly from longitudinal axis 37 toward annular surface 39. The upper or head portion 36a of diaphragm 36 is formed integral with an intermediate or neck portion 36b which extends downwardly from the head portion 36a along longitudinal axis 37. The elongate neck portion 36b is cylindrical in shape and is formed by inner and outer cylindrical surfaces 42 and 43. The outer cylindrical surface 43 of the neck portion joins lower annular surface 41 of head portion 36a at an arcuate corner 44 having a radius of approximately 0.375 inch. Neck portion 36b adjoins a circular base portion 36c which has an annular planar surface 48 adapted to be located in alignment with outlet flow passage 27. Planar surface 48 joins outer cylindrical surface 43 of neck portion 36b at an arcuate corner 49 having a radius of approximately 0.375 inch.

For the three inch valve shown in FIGS. 1 and 2, the neck portion 36b has a length from corner 44 to corner 49 of approximately two inches. The neck portion 36b has a constant outer diameter and a constant inner diameter along its length. For the three inch valve shown in FIGS. 1 and 2, the outer diameter of neck portion 36b is approximately 1.015 inch and the inner diameter is approximately 0.560 inch. Neck portion 36b thus has a constant radial thickness along its length equal to approximately 0.228 inch.

Base portion 36c is provided with an annular surface 51 extending downwardly and outwardly from planar surface 48 that is adapted to engage shoulder seat 28. A portion 36d of diaphragm 36 adjoins base portion 36c and depends downwardly therefrom and adjoins a radially extending portion 36e having an enlargement 36f formed therein which forms a secondary seal between the diaphragm 36 and the valve body 12. Portions 36e and 36f of the diaphragm 36 are formed on the outer margin of the diaphragm and are clamped between an actuator sleeve or actuator housing 52 and valve body 12. Actuator housing 52 is made from stainless steel or any other suitable material and has a flange 53 which underlies the outer margin of the valve body 12. The flange 53 is clamped into engagement with the outer annular margin formed by the portions 36e and 36f of the diaphragm by a sanitary clamp 54 of a conventional type. Actuator housing 52 is provided with a diaphragm shoulder support member 61 which is seated within a cylindrical recess 62 provided in the diaphragm 36 and underlies base portion 36c of the diaphragm 36.

Diaphragm actuator means 66 is included within process valve 11 for moving diaphragm 36 along longitudinal axis 37 between an open position, shown in phantom lines in FIG. 1 and identified by reference numeral 67, and a closed position, shown in solid lines in FIG. 1. The diaphragm actuator means 66 includes a diaphragm insert 68 formed from any suitable material such as stainless steel. Insert 68 has a head portion or head 68a molded in contact with diaphragm head portion 36a in a cavity 69 provided therein and a cylindrical portion or member 68b disposed within a bore 71 extending longitudinally through diaphragm neck portion 36b and formed by inner cylindrical surface 42. Cylindrical portion or stem 68b of diaphragm insert 68 has an outer cylindrical surface 72 spaced inwardly of inner cylindrical surface 42 of the diaphragm 36 so as to define a cylindrical space of an annular cross section therebetween. Outer surface 72 has a diameter of approximately 0.475 inch.

A shaft 76 is mounted for axial movement in actuator housing 52 and has an upper end portion 76a adapted to threadably engage a threaded bore 77 extending axially into the lower end of stem 68b. Rotational locking means is provided for preventing rotation of shaft 76 about longitudinal axis 37 so that diaphragm 36 will not rotate within valve body 12. The locking means consists of a key sleeve 81 seated within a bore 82 provided in actuator housing 52. The key sleeve 81 is provided with a bore 83 through which shaft 76 extends. A key 84 is provided for preventing rotation between shaft 76 and the key sleeve 81 while permitting axial movement of shaft 76 with respect to the key sleeve 81. The key 84 is seated in a key way provided in the shaft 76 and in a key way provided in the key sleeve 81. An anti-rotation pin 91 is seated within a bore provided near the outer margin of the key sleeve 81 and extends axially thereof into a bore provided in the actuator housing 52 to prevent rotation of the key sleeve 81 with respect to the actuator housing 52. A guide bushing 96 is mounted within a bore provided in the actuator housing 52 and carries an O-ring seal 97 for engaging shaft 76 and an O-ring seal 98 for engaging the actuator housing. A nut 101 threadably engages the threaded lower extremity 76b of shaft 76 and is provided with a flange 102 which engages a thrust ball bearing assembly 103. The assembly 103 engages the key sleeve 81 to hold the key sleeve in place so the key sleeve cannot move axially within bore 82. The nut 101 is held in place by another ball bearing assembly 104 that, in turn, is held in position within the bore 82 and in engagement with the flange 102 by snap ring 106 seated in the actuator housing 52.

Means is provided for causing operation of diaphragm actuator means 66 to cause axial movement of shaft 76 and includes a knob 111 of a size adapted to be grasped by a human hand. A set screw 112 extends through the knob and engages the nut 101 for causing rotation of the nut 101 with the knob and to thereby cause axial movement of the shaft 76. An O-ring 113 is provided for establishing a sealing engagement between shaft 76 and the knob 111.

A leak indication vent 116 is provided in actuator housing 52 to provide an indication that a leak has occurred through the diaphragm 36. An annular wiper seal 117 is provided and has a portion disposed within the knob 111 that engages the exterior surface of the actuator housing 52. The wiper seal 117 extends beyond the knob 111 and serves to inhibit the passage of liquid between the actuator housing 52 and the knob 111.

Operation and use of the process valve 11 may now be described as follows. Let it be assumed that it is desired to use the process valve 11 on tanks utilized for aseptic processing of materials such as those utilized in making pharmaceuticals. Also, let it be assumed that the valve 11 has been formed of materials suitable for such aseptic use such as ASME SA 479 316L stainless steel for the metal parts and HSP XIX Class V implantable silicone for the diaphragm 36 and that the valve 11 has been assembled by the use of sanitary clamp 54. The clamp 54 serves to clamp the actuator housing 52 to the valve body 12 to firmly clamp the outer margin comprised of the portions 36e and 36f of the diaphragm 36 between the same. At the same time, the diaphragm shoulder support member 61 urges diaphragm portion 36c and the sealing surface 51 of the diaphragm 36 into engagement with the shoulder seat 28 to establish the primary axial seal between the diaphragm 36 and valve body 12.

Let it be assumed that the head portion 36a of the diaphragm 36 is out of engagement with annular valve seat 21 and that it is desired to interrupt the communication between inlet flow passage 22 and outlet flow passage 27 of the valve 11. The operator grasps knob 111 and rotates the same in a clockwise direction to cause the nut 101 to rotate on the shaft 76 so as to move the shaft 76 and diaphragm insert 68 in diaphragm head portion 36a upwardly toward inlet flow passage 22. The force applied to move the diaphragm head portion 36a toward the inlet flow passage 22 must be sufficient to overcome the pressure of the liquid in the tank connected to inlet 16. Knob 111 is further rotated until the upper annular surface 39 of diaphragm head portion 36a is moved into engagement with annular valve seat 21 to form a positive liquid tight seal.

When it is desired to open process valve 11, knob 111 is rotated in an opposite or counterclockwise direction to break the seal between annular surface 39 and the annular valve seat 21. As the diaphragm head portion 36a is moved toward an open position, flow is permitted between the inlet flow passage 22 and the outlet flow passage 27. If for example a tank is being drained, liquid in the tank will flow through the outlet passage and flow completely out of the valve because the top planar surface 48 of the diaphragm base portion 36c is at the same level as the flow passage 27. The guide bushing 96 with its O-rings 97 and 98 serves to provide a seal so that in case of rupture of diaphragm 36, the seals 97 and 98 will serve as a secondary seal to keep liquid product passing through the flow passages 22 and 27 from coming into contact with the operating parts of the diaphragm actuator means 66. In case there is such a rupture of the diaphragm 36, the presence of a liquid between the diaphragm 36 and the shoulder support member 61 will become known because the liquid will leak out of vent 116.

Diaphragm 36 is sized relative to valve body 12 such that the neck portion 36b of the diaphragm 36 is in compression during a portion of its operational stroke and in tension in another portion of its operational stroke. The diaphragm 36 moves along longitudinal axis 37 to an intermediate position, shown in phantom lines in FIG. 1 and identified therein by reference numeral 118, during each stroke between its open and closed positions. Intermediate position 118 is approximately half-way between the open and closed positions of diaphragm 36. Diaphragm travels approximately 0.405 inch between its fully open position 67 and its intermediate position 118 and travels approximately another 0.405 inch between its intermediate position 118 and its fully closed position for a total stroke travel of approximately 0.810 inch.

Neck portion 36b of the diaphragm 36 is longitudinally sized so that the diaphragm has a free length, that is the diaphragm is in a relaxed state and neither in compression nor tension, when the diaphragm is at its intermediate position 118. It can thus be seen that diaphragm actuator means 66 causes the diaphragm 36, including neck portion 36b, to be placed in tension by moving the diaphragm upwardly from its intermediate position 118 to its closed position. Conversely, the diaphragm 36 and neck portion 36b thereof are placed in compression when the diaphragm is moved from its intermediate position 118 to its fully open position 67. Neck portion 36b is radially sized so as to permit the stretching or expansion of the material in neck portion 36b while head portion 36a of the diaphragm is upwardly of its intermediate position 118. Inner cylindrical surface 42 of the diaphragm neck portion 36c and outer cylindrical surface 72 of stem 68b are relatively sized so as to permit the neck portion 36b to easily slide upwardly and downwardly on the stem 68b during movement of the diaphragm between its open and closed positions.

The utilization of both the tensile and compression characteristics of diaphragm 36 reduce the maximum stresses and strains experienced by neck portion 36b during use of diaphragm 36. As discussed above, the elastomeric material of diaphragm 36 is in relaxed or unstressed state when the diaphragm 36 is in its intermediate position 118. In contrast, the stresses and strains experienced by the diaphragm 36 would be approximately twice as large if the diaphragm 36 was sized so as to be in a relaxed or non-stressed state when in one of its extreme open or closed positions and in a fully compressed or tensioned state when in its other extreme open or closed position.

The uniform radial thickness of diaphragm neck portion 36b along its length causes the magnitude of the stresses and strains experienced by the diaphragm to be relatively constant along the length of neck portion 36b. As a result, the stretching and compressing of the material of the neck portion 36b is shared equally along the length of the neck portion. Thus, the time to failure for neck portion 36b is increased and the service life of diaphragm 36 is likewise increased.

Diaphragm 36 is not prone to buckling or folding over onto itself so as to limit steam access for cleaning the valve 11. The wall thickness of neck portion 36b provides the neck portion with sufficient rigidity so that the neck portion simply compresses and thickens but does not buckle or wrinkle when the diaphragm 36 is under compression. The reduced maximum compressive stresses experienced by diaphragm neck portion 36b during cycling and the straight neck configuration of the neck portion 36b hinder the diaphragm 36 from buckling or wrinkling when under compression. The constant inner and outer radial dimensions of the neck portion 36b along its length eliminate weakened spots on the neck portion 36b which contribute to bending of the neck portion 36b at that point when the neck portion is placed in compression. As a result, the neck portion 36b is disinclined to bend outwardly while in compression. The relatively close spacing between inner cylindrical surface 42 of the neck portion 36b and outer cylindrical surface 72 of stem 68b inhibit collapsing of the neck portion 36b when the diaphragm is in compression. The foregoing characteristics of diaphragm facilitate its sterilization and cleaning.

It should be appreciated that the aseptic valve construction of the present invention can be utilized in conjunction with a cylinder or motor driven actuator of a type which is conventionally available in place of the manually operated knob 111 described above. A conventional motor driven actuator can be utilized to operate the valve by revamping the shaft 76 to accommodate the motor driven actuator in place of the knob 111. The valve construction herein has applications beyond outlet valves. For example, the valve construction can be used in connecting piping. The valve construction is also scalable for use in valves of all sizes.

From the foregoing, it can be seen that a new and improved aseptic valve construction has been provided in which the diaphragm is not susceptible to buckling or wrinkling when placed in compression. Areas of high stress and strain in the diaphragm are minimized so as to increase the operating life of the diaphragm. The diaphragm is in tension at one extreme position and in compression at its other extreme position. More specifically, the diaphragm is in tension in one half of its stroke and in compression in the other half of its stroke. The diaphragm can have a straight neck for accomplishing these objectives.

What is claimed is:

1. In an aseptic valve construction, a valve body having an inlet flow passage and at least one outlet flow passage, the valve body having a valve seat surrounding the inlet flow passage, the valve body having an opening therein in alignment with the inlet flow passage and in communication with the inlet flow passage and with the at least one outlet flow passage, the valve body having a shoulder providing a shoulder seat surrounding the opening, a diaphragm extending along an axis from the opening to the inlet passage and having a surface adapted to be moved into engagement with the valve seat and having another surface in engagement with the shoulder seat, the diaphragm having a cylindrical portion extending between the surface engaging the valve seat and the surface engaging the shoulder seat, the cylindrical portion having a length and a constant inner diameter and a constant outer diameter along its length for preventing the cylindrical portion from buckling or wrinkling, diaphragm actuator means for moving the diaphragm along the axis between open and closed positions with respect to the valve seat and an intermediate position between the open and closed positions whereby in the closed position the diaphragm interrupts flow of a liquid from the inlet flow passage to the outlet flow passage and in the open position the diaphragm permits the flow of liquid from the inlet flow passage to the outlet flow passage, the cylindrical portion of the diaphragm being in axial compression between the open and intermediate positions and being in axial tension between the intermediate and closed positions.

2. A valve construction as in claim 1 wherein the diaphragm is made from an elastomeric material.

3. A valve construction as in claim 1 wherein the cylindrical portion of the diaphragm has a bore extending therethrough along the axis, the diaphragm actuator means including a cylindrical member disposed in the bore, the cylindrical member having an outer diameter, the inner diameter of the cylindrical portion and the outer diameter of the cylindrical member being relatively sized to permit relative axial movement of the cylindrical portion and the cylindrical member during movement of the diaphragm between the open and closed positions and to inhibit radial collapsing of the cylindrical member during such movement.

4. In an aseptic valve construction, a valve body having an inlet flow passage and at least one outlet flow passage, the valve body having a valve seat surrounding the inlet flow passage, the valve body having an opening therein in alignment with the inlet flow passage and in communication with the inlet flow passage and with the at least one outlet flow passage, the valve body having a shoulder providing a shoulder seat surrounding the opening, a diaphragm extending along an axis from the opening to the inlet flow passage and having a surface adapted to be moved into engagement with the valve seat and having another surface in engagement with the shoulder seat, the diaphragm having a cylindrical portion extending between the surface engaging the valve seat and the surface engaging the shoulder seat, the cylindrical portion having a length and a constant inner diameter and a constant outer diameter along its length for preventing the cylindrical portion from buckling or wrinkling, the diaphragm changeable from a compressed state to an expanded state between open and closed positions and being in a relaxed state between the compressed and expanded states.

5. A valve construction as in claim 4 wherein the diaphragm is made from an elastomeric material.

6. A method for operating an aseptic valve construction having a valve body provided with an inlet flow passage and at least one outlet flow passage and an opening in alignment with the inlet flow passage and in communication with the inlet flow passage and with the at least one outlet flow passage, the valve body having a valve seat surrounding the inlet flow passage and a shoulder providing a shoulder seat surrounding the opening, a diaphragm having a surface adapted to be moved into engagement with the valve seat and having another surface in engagement with the shoulder seat, the method comprising the steps of moving the diaphragm between open and closed positions relative to the valve seat, compressing the diaphragm when moving the diaphragm to an open position and tensioning the diaphragm when moving the diaphragm to a closed position.

7. A method as in claim 6 wherein the diaphragm has an intermediate portion extending between the surface engaging the valve seat and the surface engaging the shoulder seat, the intermediate portion having a length and a constant radial thickness along its length.

8. A method as in claim 7 wherein the intermediate portion is cylindrical in shape, the intermediate portion having a constant inner diameter and a constant outer diameter extending along its length.

* * * * *